United States Patent
Zhao (10) Patent No.: US 8,229,296 B2
(45) Date of Patent: Jul. 24, 2012

(54) METHOD AND APPARATUS FOR CHANNEL PROTECTION SWITCHING OF OPTICAL NETWORK DEVICE

(75) Inventor: Chan Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 433 days.

(21) Appl. No.: 12/512,826

(22) Filed: Jul. 30, 2009

(65) Prior Publication Data

US 2009/0290867 A1    Nov. 26, 2009

Related U.S. Application Data

(63) Continuation of application No. PCT/CN2008/072988, filed on Nov. 7, 2008.

(30) Foreign Application Priority Data

Nov. 9, 2007   (CN) ............................ 2007 1 0188108

(51) Int. Cl.
*H04B 10/00*   (2006.01)
(52) U.S. Cl. .................. 398/2; 398/5; 398/10; 398/17; 398/25; 398/58; 398/66
(58) Field of Classification Search ............... 398/1–38, 398/45, 58–75; 370/216–258
See application file for complete search history.

(56) References Cited

U.S. PATENT DOCUMENTS

| | | | | |
|---|---|---|---|---|
| 5,680,389 A | * | 10/1997 | Douglas et al. | 370/228 |
| 7,289,728 B2 | * | 10/2007 | Wang et al. | 398/5 |
| 7,561,795 B2 | * | 7/2009 | Mascolo et al. | 398/19 |
| 2004/0033077 A1 | | 2/2004 | Kim et al. | |
| 2005/0141892 A1 | * | 6/2005 | Park et al. | 398/71 |
| 2006/0228113 A1 | | 10/2006 | Cutillo et al. | |
| 2008/0095535 A1 | | 4/2008 | Zou | |

FOREIGN PATENT DOCUMENTS

| | | |
|---|---|---|
| CN | 1392683 A | 1/2003 |
| CN | 1968175 A | 5/2007 |
| CN | 101159495(A) | 4/2008 |
| JP | 2007-194983 | 8/2007 |
| WO | WO 01/53783 A1 | 7/2001 |

OTHER PUBLICATIONS

ITU-T Recommendation G.873.1, Series G: Transmission Systems and Media, Digital Systems and Networks, "Optical Transport Network (OTN): Linear protection," Mar. 2003.

(Continued)

*Primary Examiner* — Li Liu (74) *Attorney, Agent, or Firm* — Finnegan, Henderson, Farabow, Garrett & Dunner LLP (57) ABSTRACT

A method for channel protection switching of an optical network device, an Optical Transport Network (OTN) device, and a Passive Optical Network (PON) device is provided. The method includes detecting, by the PON device, whether an OTN alarm indication signal is received after discovering a fault. If the OTN alarm indication signal is received, the alarm generated by the PON device is suppressed so that the PON device does not perform channel protection switching. The PON device detects whether an OTN alarm indication signal is received, and suppresses the alarm generated by the PON device so that the PON does not generate futile alarms or lead to futile switching when the OTN fails but the PON works normally.

11 Claims, 6 Drawing Sheets

OTHER PUBLICATIONS

ITU-T G.709/Y.1331, Series G: Transmission Systems and Media, Digital Systems and Networks, Digital terminal equipments—General Series Y: Global Information Infrastructure, Internet Protocol Aspects and Next-Generation Networks, Internet protocol aspects—Transport, Interfaces for the Optical Transport Network (OTN), Nov. 2007.

ITU-T G.984.1, Telecommunication Standardization Sector of ITU Series G: Transmission Systems and Media, Digital Systems and Networks, Digital sections and digital line system—Optical line systems for local and access networks, Gigabit-capable Passive Optical Networks (GPON): General characteristics, ITU-T, Mar. 2003.

First Chinese Office Action dated (mailed) : Mar. 23, 2011 issued in related Chinese Application No. 200710188108.8, Huawei Technologies Co., Ltd.

Extended European Search Report dated (mailed) Mar. 14, 2011, issued in related Application No. 08849815.9-2415, PCT/CN2008072988, filed Mar. 14, 2011, Hauwei Technologies Co., Ltd.

Written Opinion of the International Searching Authority (translation) dated (mailed) Feb. 12, 2009, issued in related Application No. PCT/CN2008/072988, filed Nov. 7, 2008, Huawei Technologies Co., Ltd.

International Search Report from the Chinese Patent Office for International Application No. PCT/CN2008/072988.

* cited by examiner

METHOD AND APPARATUS FOR CHANNEL PROTECTION SWITCHING OF OPTICAL NETWORK DEVICE

This application is a continuation of International Application No. PCT/CN2008/072988 filed Nov. 7, 2008, which claims priority to Chinese Patent Application No. 200710188108.8, filed with the Chinese Patent Office on Nov. 9, 2007 and entitled "Method and Apparatus for Channel Protection Switching of Optical Network Device". These applications are hereby incorporated by reference in their entirety.

TECHNICAL FIELD

The present disclosure relates to network communication technologies, and in particular, to a method and an apparatus for channel protection switching of an optical network device.

BACKGROUND

With the emergence of new services such as Video On Demand (VOD), high definition television, and online games, the bandwidth required by users is increasing. The development of the Fiber-To-The-Home (FTTH) ensures the last mile bandwidth of the access network. The Passive Optical Network (PON) technology eliminates the active nodes in the traditional access network, and helps cut back maintenance expenses of the operators, and is one of the most popular FTTH technologies currently.

The existing PON standards include: the Broadband Passive Optical Network (BPON) and the Gigabit PON (GPON) developed by the Full Service Access Network (FSAN) organization and formulated by the ITU-T; and the Ethernet-PON (EPON) formulated by the IEEE organization. The coverage of the existing PON is 20 km, and the uplink rate and the downlink rate of the existing PON are of the gigabit magnitude. With the emergence of the next-generation optical access network, large operators such as British Telecom (BT) raises the requirement of extending the PON to be a 100 km distance. In January 2006, BT, Siemens, Alcatel, CIP and other companies and institutes initiated the Photonic Integrated Extended Metropolitan Area Access Network (PIE-MAN) project in Europe, and raised the system objectives of a 10 Gbps symmetric rate, a 100 km transmission distance, and a 512 split ratio. The distance extension of the PON is conducive to integrating the access network with the Metropolitan Area Network (MAN), reducing network nodes required, and cutting back the maintenance expenses.

Figure 1:
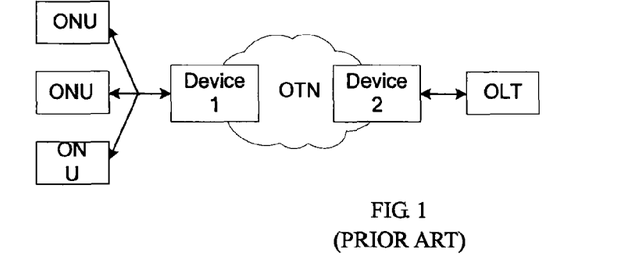
FIG. 1 shows a type of GPON-over-OTN architecture according to the conventional art.

With the development of the PON, GPON-over-OTN architecture is currently applied, as shown in FIG. 1. This architecture implements distance extension of the GPON by increasing the access radius of the GPON through an Optical Transport Network (OTN). In this architecture, many Optical Network Units (ONUs) are connected to an optical splitter through fibers. The optical splitter is interconnected with the OTN device 1. An Optical Line Terminal (OLT) is interconnected with the OTN device 2 through fibers. The OTN device 1 is connected with the OTN device 2 through the OTN. When the GPON or the OTN fails, the GPON or the OTN performs protection switching separately. The protection switching based on the GPON-over-OTN architecture is described below:

GPON protection switching is generally described below.

When the GPON network raises an alarm related to signal loss, frame loss, or signal failure, protection switching is triggered between the active traffic channel and the standby traffic channel. The following four types of protection are available:

Protection type A: Only the backbone fiber is backed up. Neither ONU nor OLT is backed up.

Protection type B: The OLT is protected through cold backup, the optical splitter port at the OLT side is backed up, the backbone fiber is backed up, and the ONU is not backed up.

Protection type C: The OLT and all ONUs are protected through hot backup, the Optical Distribution Network (ODN) is backed up, which is known as full backup.

Protection type D: The OLT and some ONUs are protected through cold backup, and the ODN is backed up.

OTN Protection Switching

In 1998, the ITU-T puts forward the concept of OTN. The ONT transmits various client signals transparently, performs multiplexing, transmission, routing and amplification on the optical domain, and supports flexible network scheduling and networking protection. When the OTN network raises an alarm, the alarm triggers protection switching of the OTN. The OTN protection mechanisms recommended by the OTN network protection switching standard G.872 include: path protection mechanism, subnet connection protection mechanism, and shared protection ring mechanism.

In the process of developing the present invention, the inventor finds at least these defects in the prior art: When the OTN fails, for example, when a fiber is cut or the GPON Transmission Convergence (GTC) frame of the transmitted service is lost, the OTN raises an alarm to trigger the OTN protection switching. In this case, although the PON works normally, the PON is unable to receive the GTC frame normally, thus resulting in futile alarms and switching of the PON.

BRIEF SUMMARY

A method and an apparatus for channel protection switching of an optical network device are provided. The method for channel protection switching of an optical network device includes the following steps detecting, by a PON device, whether an OTN alarm indication signal is received after discovering a fault, and if the OTN alarm indication signal is received, suppressing the alarm raised by the PON device so that the PON device does not perform channel protections switching.

An OTN device is also provided. The OTN device includes a first channel switching unit, adapted to switch the service from the active channel to the standby channel of the OTN after detecting a fault, and an alarm indication signal generating unit, adapted to generate an OTN alarm indication signal after the OTN device detects a fault, and send the OTN alarm indication signal to the PON device so that the PON device suppresses the alarm generated by the PON device.

A PON device is further provided. The PON device includes an alarm indication signal processing unit, adapted to: suppress the alarm generated by the PON device after receiving an OTN alarm indication signal from the OTN device so that the PON device does not perform channel protection switching According to some embodiments, the PON device and method may detect whether an OTN alarm indication signal is received, and suppress the alarm generated by the PON device so that the PON does not generate futile alarms or lead to futile switching when the OTN fails but the PON works normally.

It is to be understood that both the foregoing general description and the following detailed description are exemplary and explanatory only and are not restrictive of the embodiments disclosed herein.

The accompanying drawings, which are incorporated in and constitute a part of this specification, illustrate some embodiments and together with the description, serve to explain the principles of the embodiments disclosed herein.

DETAILED DESCRIPTION

The present disclosure is described in detail hereunder with reference to the accompanying drawings and specific embodiments.

Figure 2:
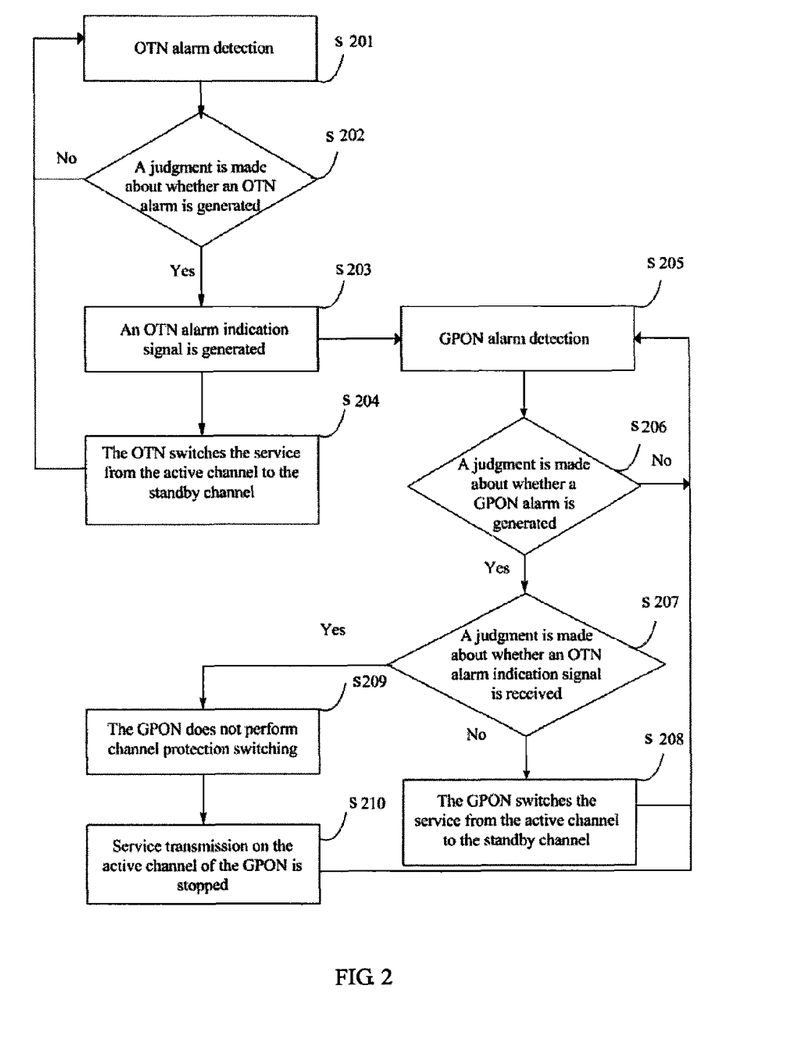
FIG. 2 is a flowchart of a method for channel protection switching of an optical network device according to some embodiments.

FIG. 2 is a flowchart of a method for channel protection switching of an optical network device according to some embodiments. The method includes the following steps:

Step s201: In the normal state, the OTN keeps detecting the OTN alarm. An idle block of an OTN specific bit pattern is inserted into an uplink timeslot blank of the uplink GTC frame of the ONU at the time of OTN device mapping, thus forming an ODUk frame of a constant bit rate. At the time of OTN device demapping, the idle block is removed and the GTC frame is recovered.

Step s202: A judgment is made about whether an OTN alarm is generated. If an OTN alarm is generated, the process proceeds to step s203; otherwise, the process proceeds to step s201. The OTN generates an alarm when detecting a fault.

Step s203: An OTN alarm indication signal is generated and sent to the GPON. The OTN alarm indication signal carries the alarm information of the OTN. This alarm information indicates that the alarm is triggered by an OTN fault.

Step s204: The OTN switches the service from the active channel to the standby channel of the OTN, and then returns to the OTN alarm detection state. In this way, the OTN protection switching is implemented. The protection mechanism of the OTN may be: path protection mechanism, subnet connection protection mechanism, or shared protection ring mechanism, which is recommended by the G.872.

Step s205: In the normal state, the GPON keeps detecting alarms.

Step s206: A judgment is made about whether a GPON alarm is generated. If a GPON alarm is generated, the process proceeds to step s207; otherwise, the process proceeds to step s205.

Step s207: A judgment is made about whether an OTN alarm indication signal is received. If an OTN alarm indication signal is received, the process proceeds to step s209; otherwise, the process proceeds to step s208.

Step s208: The GPON switches the service from the active channel to the standby channel. That is, when no OTN alarm signal is received, it is deemed that the GPON fails. Therefore, the GPON switches the service from the active channel to the standby channel of the GPON, and then the process returns to step s205.

Step s209: The alarm generated by the GPON device is suppressed so that the GPON does not perform channel protection switching.

Step s210: The service transmission on the active channel of the GPON stops, and the process proceeds to step s205. After the alarm from the OTN disappears, the service transmission on the active channel of the GPON recovers, where "disappear" means that no OTN alarm indication signal is received within a set period. In this way, the GPON protection switching is accomplished. The GPON protection switching type may be protection type B, protection type C, or protection type D, which is defined by the GPON standard G.984.1.

Figure 3:
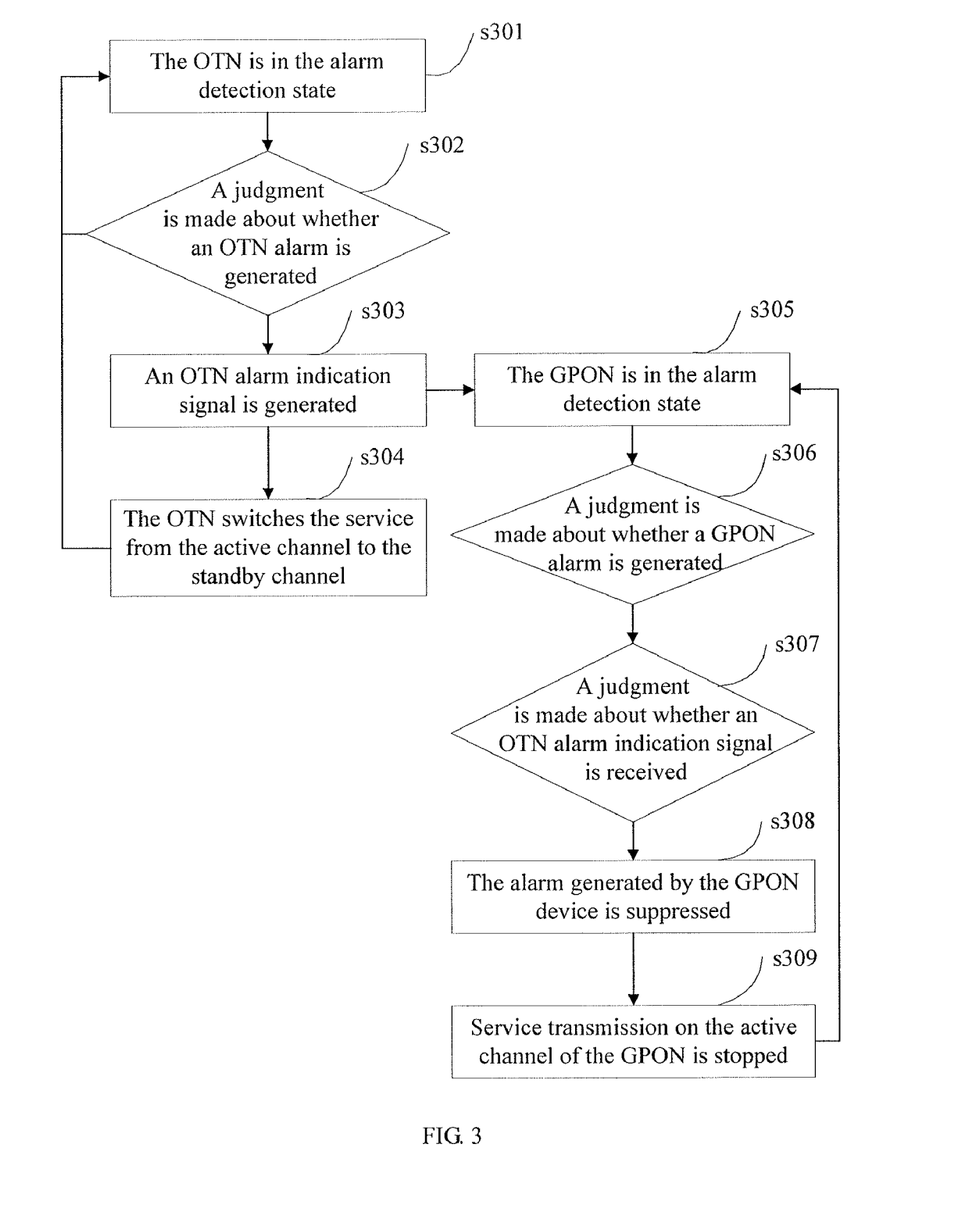
FIG. 3 is another flowchart of a method for channel protection switching of an optical network device according to some embodiments.

FIG. 3 is a flowchart of a method for channel protection switching of an optical network device when the OTN raises an alarm but the PON raises no alarm according to some embodiments. The method includes the following steps:

Step s301: In the normal state, the OTN keeps detecting alarms.

Step s302: A judgment is made about whether an OTN alarm is generated. If an OTN alarm is generated, the process proceeds to step s303; otherwise, the process proceeds to step s301. The OTN generates an alarm when detecting a fault.

Step s303: An OTN alarm indication signal is generated and sent to the GPON. The OTN alarm indication signal carries the alarm information of the OTN. This alarm information indicates that the alarm is triggered by an OTN fault.

Step s304: The OTN switches the service from the active channel to the standby channel of the OTN, and then returns to the OTN alarm detection state.

Step s305: In the normal state, the GPON keeps detecting alarms.

Step s306: A judgment is made about whether a GPON alarm is generated. If a GPON alarm is generated, the process proceeds to step s307; otherwise, the process proceeds to step s305.

Step s307: A judgment is made about whether an OTN alarm indication signal is received. In this embodiment, no OTN alarm signal is received, and the process proceeds to step s308.

Step s308: The alarm generated by the GPON device is suppressed so that the GPON device does not perform channel protection switching.

Step s309: The service transmission on the active channel of the GPON stops, and does not resume the service transmission on the active channel until the alarm disappears, where "disappear" means that no OTN alarm indication signal is received within a set period.

Figure 4:
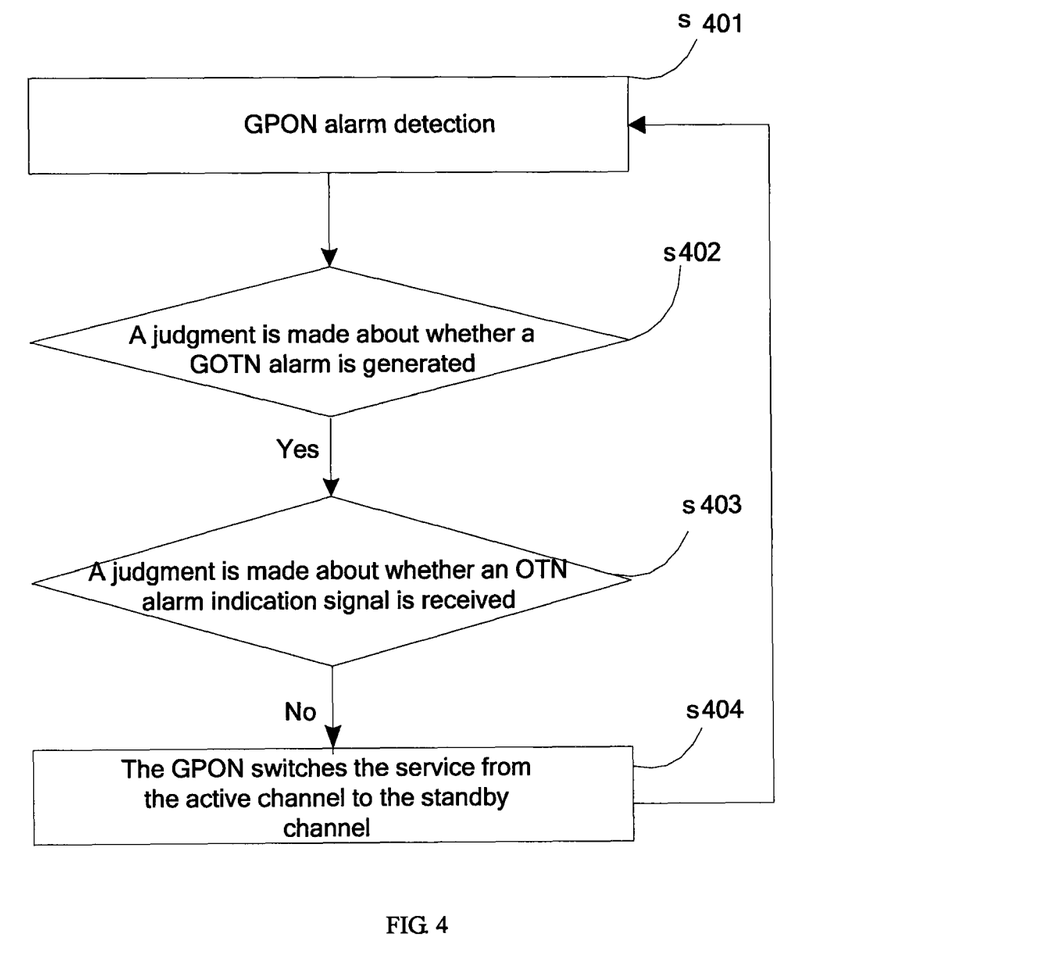
FIG. 4 is another flowchart of a method for channel protection switching of an optical network device according to some embodiments.

FIG. 4 is a flowchart of a method for channel protection switching of an optical network device when the OTN raises no alarm but the PON raises an alarm according to some embodiments. The method includes the following steps:

Step s401: In the normal state, the GPON keeps detecting alarms.

Step s402: A judgment is made about whether an OTN alarm occurs. Once an OTN alarm is detected, the process proceeds to step s403.

Step s403: A judgment is made about whether an OTN alarm indication signal is received. If no OTN alarm indication signal is received, the process proceeds to step s404.

Step s404: The GPON switches the service from the active channel to the standby channel, and then the process returns to step s401 to continue detecting the alarm of the GPON.

Figure 5:
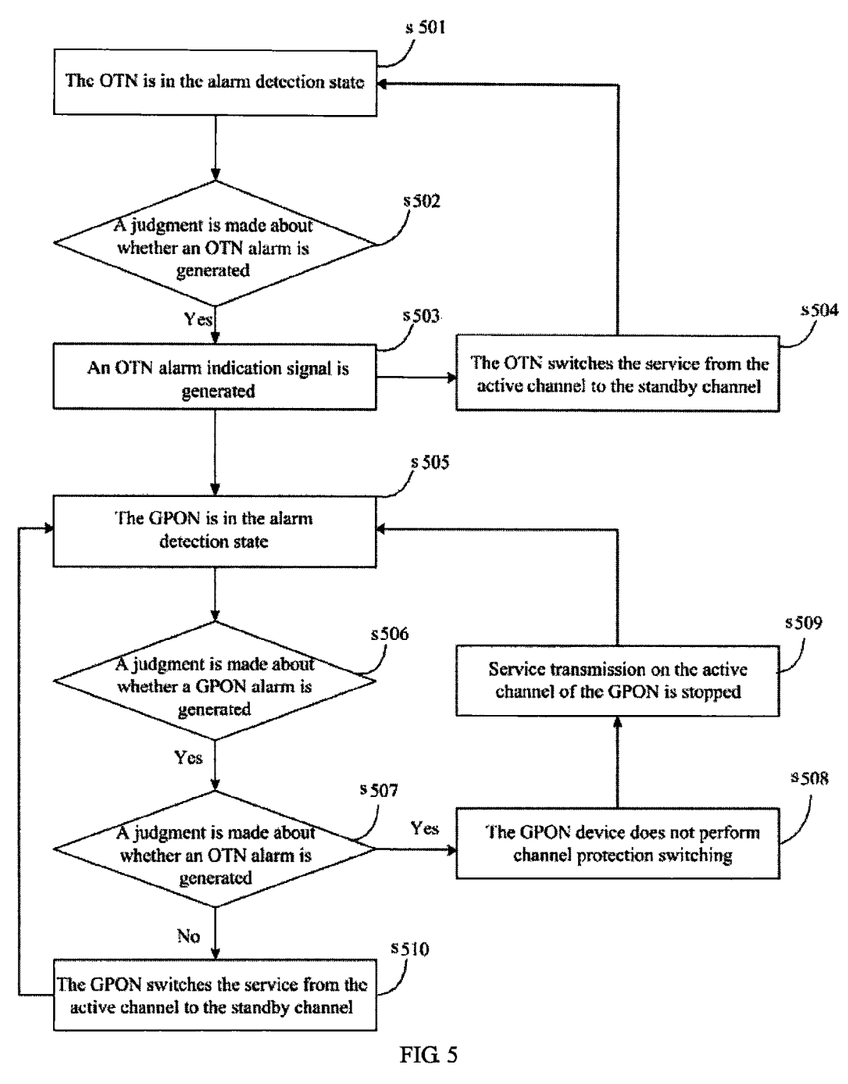
FIG. 5 is another flowchart of a method for channel protection switching of an optical network device according to some embodiments.

FIG. 5 is a flowchart of a method for channel protection switching of an optical network device when both the OTN and the PON raise an alarm according to some embodiments. The method includes the following steps:

Step s501-step s504: These steps are the same as step s301-step s304.

Step s505: In the normal state, the GPON keeps detecting alarms.

Step s506: A judgment is made about whether a GPON alarm occurs. Once a GPON alarm is detected, the process proceeds to step s507.

Step s507: A judgment is made about whether an OTN alarm indication signal is received from the OTN. If an OTN alarm indication signal is received, the process proceeds to step s508; otherwise, the process proceeds to step s510. If no OTN alarm indication signal is received from the OTN, the reasons includes: The link between the GOTN and the OTN fails; or the service of the OTN is switched from the active channel to the standby channel of the OTN and the fault is cleared.

Step s508: The alarm generated by the GPON device is suppressed so that the GPON device does not perform channel protection switching.

Step s509: The service transmission on the active channel of the GPON stops, and the process proceeds to step s505.

Step s510: The GPON switches the service from the active channel to the standby channel of the GPON. The process returns to step s505 to continue detecting the alarm of the GPON.

Consistent with some disclosed embodiments, the PON device detects whether an OTN alarm indication signal is received, and suppresses the alarm generated by the PON device so that the PON does not generate futile alarms or lead to futile switching when the OTN fails but the PON works normally.

Figure 6:
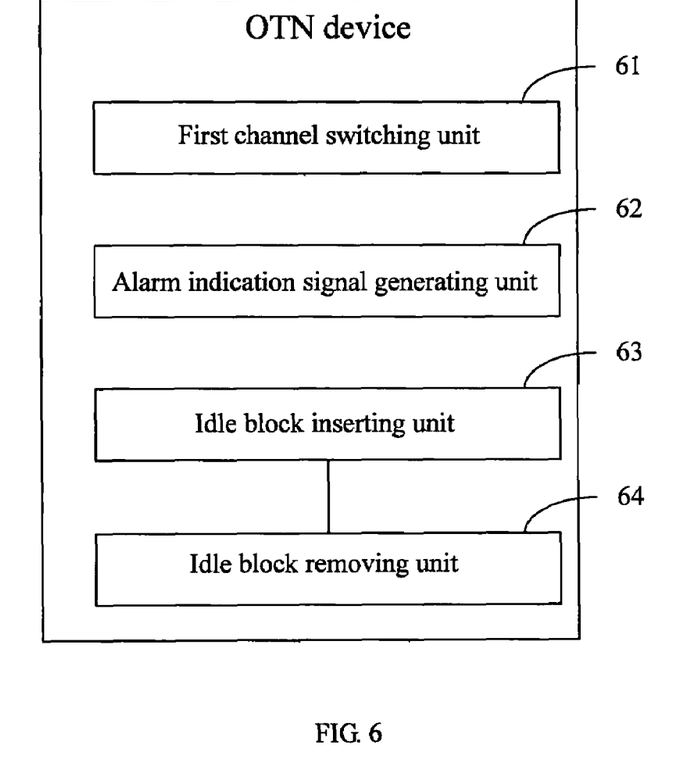
FIG. 6 shows a structure of an OTN device according to some embodiments.

FIG. 6 shows an OTN device according to some embodiments. The OTN device includes: a first channel switching unit 61, an alarm indication signal generating unit 62, an idle block inserting unit 63, and an idle block removing unit 64. The idle block inserting unit 63 is connected with the idle block removing unit 64.

The first channel switching unit 61 is adapted to switch the service from the active channel to the standby channel of the OTN after the OTN device detects a fault.

The alarm indication signal generating unit 62 is adapted to: generate an OTN alarm indication signal after the OTN device detects a fault, and sends the OTN alarm indication signal to the PON device so that the PON device suppressed the alarm generated by the PON device.

The idle block inserting unit 63 is adapted to insert an idle block of an OTN specific bit pattern into a blank timeslot when the service data received from the ONU contains a blank timeslot.

The idle block removing unit 64 is adapted to: remove the idle block of OTN specific bit pattern inserted by the idle block inserting unit 63 in the service data after the service data is forwarded to the PON device, and recover the service data sent by the ONU.

Figure 7:
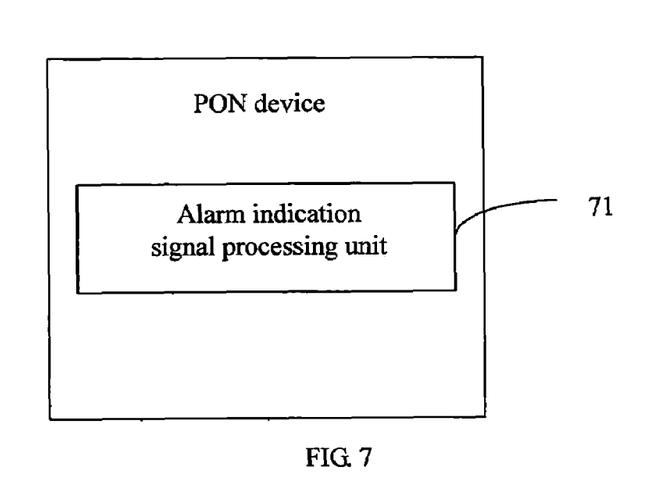
FIG. 7 shows a structure of a PON device according to some embodiments.
Figure 8:
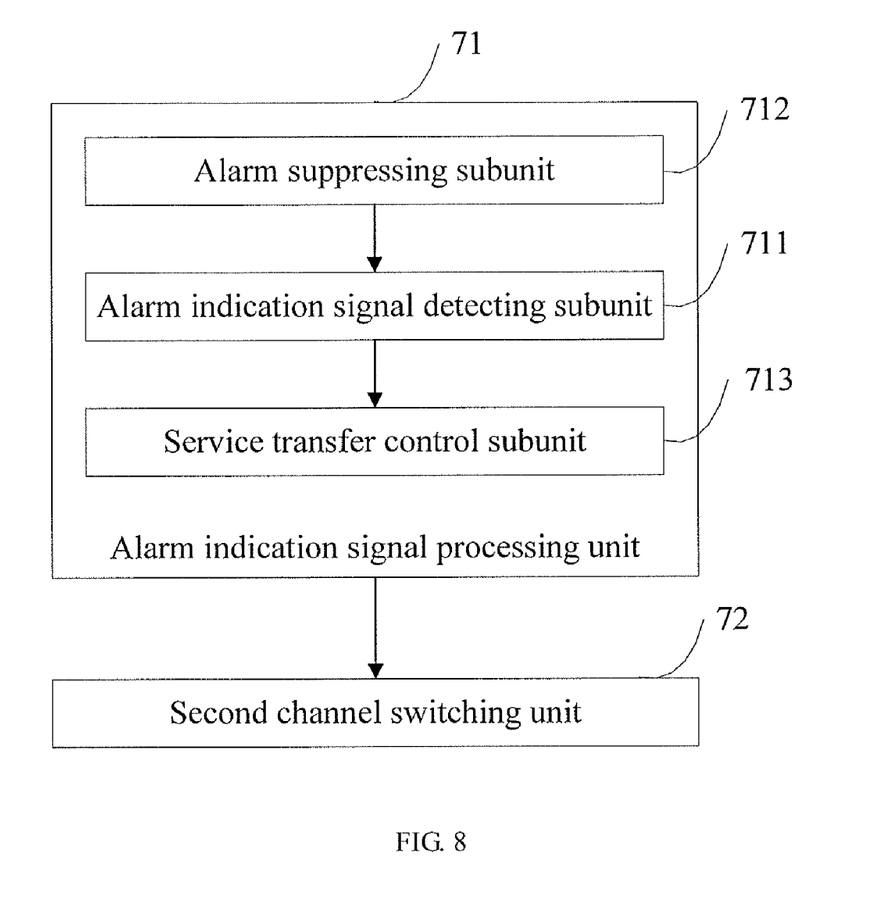
FIG. 8 shows another structure of a PON device according to some embodiments.

FIG. 7 shows a PON device according to some embodiments. The PON device includes an alarm indication signal processing unit 71. As shown in FIG. 8, the PON device may further include a second channel switching unit 72. The alarm indication signal processing unit 71 is connected with the second channel switching unit 72.

The alarm indication signal processing unit 71 is adapted to: suppress the alarm generated by the PON device after receiving an OTN alarm indication signal from the OTN device so that the PON device does not perform channel protection switching.

The second channel switching unit 72 is adapted to switch the service from the active channel to the standby channel of the PON after the PON device detects a fault and receives no OTN alarm indication signal from the OTN device.

The alarm indication signal processing unit 71 includes: an alarm indication signal detecting subunit 711, an alarm suppressing subunit 712, and a service transfer control subunit 713.

The alarm indication signal detecting subunit 711 is connected with the alarm suppressing subunit 712 and the service transfer control subunit 713, and is adapted to detect whether any OTN alarm indication signal is received from the OTN device.

The alarm suppressing subunit 712 is adapted to suppress the alarm generated by the PON device after the alarm indication signal detecting subunit 711 detects receiving of an OTN alarm indication signal from the OTN device so that the PON device does not perform channel protection switching.

The service transfer control subunit 713 is adapted to: stop transmitting services on the active channel of the PON if the alarm indication signal detecting subunit 711 detects that an OTN alarm indication signal is received from the OTN device, and recover service transmission on the active channel of the PON if the alarm indication signal detecting subunit 711 detects that no OTN alarm indication signal is received within the set period.

Consistent with some embodiments, the PON device detects whether an OTN alarm indication signal is received, and suppresses the alarm generated by the PON device so that the PON does not generate futile alarms or lead to futile switching when the OTN fails but the PON works normally.

The GPON-over-OTN protection switching in the foregoing embodiments fulfills a mutually coordinating switching mechanism which is primarily specific to the OTN and covers the server layer to the client layer. The GPON is located on the client layer, and the OTN is located on the server layer and is transparent to the GPON fault. The GPON fault is still detected by the GPON, and the switching is still triggered by the GPON, without increasing complexity or cost of the OTN device. Unidirectional OTN alarm indication signals serve as coordinating signals from the OTN to the GPON.

Because other PONs such as BPON and EPON are physically similar to the GPON, some embodiments are also applicable to other types of PON over OTN.

It is understandable to those skilled in the art that all or part of the steps of the foregoing embodiments may be implemented by hardware instructed by a computer program. The program may be stored in a computer-readable storage medium. Once being executed, the program performs the processes covered in the foregoing embodiments. The storage medium may be a magnetic disk, compact disk, Read-Only Memory (ROM), or Random Access Memory (RAM).

Although embodiments have been described through several preferred embodiments, the disclosure is not limited to such embodiments. It is apparent that those skilled in the art can make various modifications and variations to the disclosure without departing from the spirit and scope of the embodiments disclosed herein. The disclosure is intended to cover the modifications and variations provided that they fall in the scope of protection defined by the claims or their equivalents.

What is claimed is:

1. A method for channel protection switching of an optical network device, comprising:
   detecting, by a Passive Optical Network (PON) device, whether a PON alarm is generated;
   if the PON alarm is generated, judging, by the PON device, whether an Optical Transport Network (OTN) alarm indication signal is received from an OTN device after the OTN device discovering a fault, wherein the OTN alarm indication signal indicates that an OTN alarm is triggered by an OTN fault; and
   if the OTN alarm indication signal is received, suppressing, by the PON device, the alarm generated by the PON device so that the PON device does not perform channel protection switching.

2. The method for channel protection switching of an optical network device according to claim 1, comprising:
   switching, by the PON device, services from an active channel to a standby channel of the PON device after discovering the fault if the PON device receives no OTN alarm indication signal.

3. The method for channel protection switching of an optical network device according to claim 1, wherein the method further comprises:
   stopping, by the PON device, service transmission on an active channel of the PON device if the OTN alarm indication signal is received.

4. The method for channel protection switching of an optical network device according to claim 1, further comprising:
   resuming, by the PON device, the service transmission on the active channel of the PON device after the OTN alarm indication signal disappears.

5. A Passive Optical Network (PON) device, comprising:
   an alarm indication signal detecting unit, configured to: detect whether an Optical Transport Network (OTN) alarm indication signal is received from an OTN device if a PON alarm is generated by the PON device; and
   an alarm suppressing unit, configured to suppress the PON alarm generated by the PON device if the OTN alarm indication signal is received from the OTN device so that the PON device does not perform channel protection switching, wherein the OTN alarm indication signal indicates that an OTN alarm is triggered by an OTN fault.

6. The PON device of claim 5, further comprising:
   a channel switching unit, configured to switch a service from an active channel to a standby channel of the PON device after the PON device detects a fault and receives no OTN alarm indication signal from the OTN device.

7. The PON device of claim 5, further comprising:
   a service transfer control unit, configured to: stop transmitting services on an active channel of the PON device if the alarm indication signal detecting unit detects that the OTN alarm indication signal is received from the OTN device, and resume service transmission on the active channel of the PON if the alarm indication signal detecting unit detects that no OTN alarm indication signal is received within a set period.

8. A network comprising an Optical Transport Network (OTN) device and a Passive Optical Network (PON) device,
   the OTN device comprising:
   a first channel switching unit, configured to switch services from an active channel to a standby channel of the OTN device after detecting a fault; and
   an alarm indication signal generating unit, configured to: generate an OTN alarm indication signal after the OTN device detects the fault; and send the OTN alarm indication signal to the PON device;
   the PON device comprising:
   an alarm indication signal detecting unit, configured to detect whether the OTN alarm indication signal is received from an OTN device if a PON alarm is generated by the PON device; and
   an alarm suppressing unit, configured to suppress the PON alarm generated by the PON device if the OTN alarm indication signal is received from the OTN device so that the PON device does not perform channel protection switching, wherein the OTN alarm indication signal indicates that an OTN ala in is triggered by an OTN fault.

9. The network of claim 8, wherein the OTN device further comprises:
   an idle block inserting unit, configured to insert an idle block of an OTN specific bit pattern into a blank timeslot contained in the service data, wherein service data is received from an Optical Network Unit (ONU).

10. The network of claim 8, wherein the PON device further comprises:
    a channel switching unit, configured to switch a service from an active channel to a standby channel of the PON device after the PON device detects a fault and receives no OTN alarm indication signal from the OTN device.

11. The network of claim 8, wherein the PON device further comprises:
    a service transfer control unit, configured to: stop transmitting services on an active channel of the PON device if the alarm indication signal detecting unit detects that the OTN alarm indication signal is received from the OTN device, and resume service transmission on the active channel of the PON if the alarm indication signal detecting unit detects that no OTN alarm indication signal is received within a set period.

* * * * *